US008930333B1

(12) United States Patent
Prince et al.

(10) Patent No.: US 8,930,333 B1
(45) Date of Patent: Jan. 6, 2015

(54) LOCKAHEAD FOR SIMULTANEOUS READERS AND WRITERS IN A CLUSTERED FILE SYSTEM

(75) Inventors: Harold B. Prince, Palo Alto, CA (US); Balemurughan Kumaresan, East Palo Alto, CA (US); Kedar Patwardhan, Pune (IN)

(73) Assignee: Symantec Corporation, Mountain View, CA (US)

( * ) Notice: Subject to any disclaimer, the term of this patent is extended or adjusted under 35 U.S.C. 154(b) by 838 days.

(21) Appl. No.: 13/099,843

(22) Filed: May 3, 2011

(51) Int. Cl.
*G06F 17/30* (2006.01)

(52) U.S. Cl.
USPC .......................................................... 707/704

(58) Field of Classification Search
CPC ................................................ G06F 17/30171
USPC .......................................................... 707/704
See application file for complete search history.

(56) References Cited

U.S. PATENT DOCUMENTS

| 5,341,491 | A | 8/1994 | Ramanujan |
| 6,823,511 | B1 | 11/2004 | McKenney et al. |
| 7,406,473 | B1 | 7/2008 | Brassow et al. |
| 7,487,228 | B1 | 2/2009 | Preslan et al. |
| 7,899,794 | B2 | 3/2011 | Bhatt et al. |

*Primary Examiner* — Huawen Peng
(74) *Attorney, Agent, or Firm* — Rory D. Rankin; Meyertons, Hood, Kivlin, Kowert & Goetzel, P.C.

(57) ABSTRACT

A system and method for efficiently performing simultaneous access of files in a clustered file system. A cluster of nodes is coupled to a data storage medium. A first node executes a first thread with write operations for a given file. A second node executes a second thread with read operations for the given file. The first thread is appending the given file. In response, the first node requests a write lock range between an end-of-file for the given file to a highest possible endpoint. If a prediction determines the second thread may request read locks after the range it is currently reading, then the method enables the locks to be efficiently transferred from the first node to the second node before they are required on the second node, allowing the reading second node to proceed with fewer delays.

17 Claims, 8 Drawing Sheets

LOCKAHEAD FOR SIMULTANEOUS READERS AND WRITERS IN A CLUSTERED FILE SYSTEM

BACKGROUND OF THE INVENTION

1. Field of the Invention

This invention relates to the field of computer processing and, more particularly, to efficiently performing simultaneous access of files in clustered file system.

2. Description of the Related Art

A company may utilize a high availability of services provided by clusters of nodes coupled via a network. Generally speaking, clustering allows software applications to run on several parallel servers, also referred to as cluster nodes. A workload is distributed across different servers. A redundant node or other second node in the cluster provides service when any of at least the following events occur: a first node fails, a first node is chosen to move for load balancing purposes, or a first node is temporarily out of service for upgrades or maintenance service. In addition, migration may occur at a finer granularity level than at a node level, such as at a level of virtual machines (VMs) within the nodes. Clustering may be used in scalable enterprise applications and scientific research institutions. Adding more nodes to the cluster may increase computing performance.

A cluster file system is not a single server with a set of clients, but rather a cluster of servers, as described above, that work together to provide high performance service to clients. The cluster is transparent to the clients. A clustered file system may be asymmetric, or metadata management does not occur on the clients, and parallel, or supports concurrent read and write operations.

A distributed lock manager provides distributed software applications with a means to synchronize their accesses to shared resources. Each node in a cluster may have a lock manager, which is part of the distributed lock manager for the entire cluster. A lock manager on a given node may include software code called a proxy that acts as an intermediary, or an authorized agent, for memory access requests. The memory access requests may come from both the file system on the given node and from other nodes in the cluster seeking data resources from the given node. Clustered file systems utilize these lock managers, in which the servers in a cluster can use each other's storage via a unified file system. Cache coherency between participating computers is provided. There may be several lock modes that can be granted by the proxy. These lock modes determine a level of exclusivity of access to the resource. The distributed lock manager may be used not only for file locking but also for coordination of all disk access. For example, a process or a corresponding thread executes read and write operations. In response to these operations, the file system on a same node as the executing thread issues associated lock requests. These lock requests are sent to a proxy within a lock manager on the same node. Communication over a network with lock managers on other nodes may be performed before granting the lock request corresponding to the read and write operations. The network communication ensures the read and write operations are performed in both an atomic and an in-order manner. If the network communication occurs frequently and a high number of messages are sent over the network, then computing performance is reduced.

In view of the above, methods and mechanisms for efficiently performing simultaneous access of files in clustered file system are desired.

SUMMARY OF THE INVENTION

Systems and methods for efficiently performing simultaneous access of files in a clustered file system are contemplated. In one embodiment, a computer system includes a cluster comprising at least two nodes coupled to a data storage medium. A first node is executing a first thread with write operations for a given file. A second node is executing a second thread with read operations for the given file. The file system on the first node may detect the write operations are appending the given file. In response, the file system on the first node requests a write lock range between an end-of-file (EOF) for the given file to a highest possible endpoint. After the write lock is granted, the first node appends the given file with write operations, wherein each completed appending write operation updates a stored value of the EOF with an up-to-date EOF. Although the file system on the first node may continue to send write lock requests for the appending operations (e.g., to a lock manager proxy), these requests are granted within the first node. For the appending write operations, additional write lock requests need not be sent from the first node to a lock manager on a second node. Therefore, network traffic is reduced.

A prediction is made whether the second thread with read operations might use sequential data after data corresponding to a current read operation. If this is the case, the second node is configured to receive a granted lock for the sequential data, wherein a range for the granted lock may be determined by at least the writing first node. At a later time, if the file system on the second node sends read lock requests for this data to a corresponding lock manager proxy, these requests are granted within the second node.

These and other embodiments will be appreciated upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
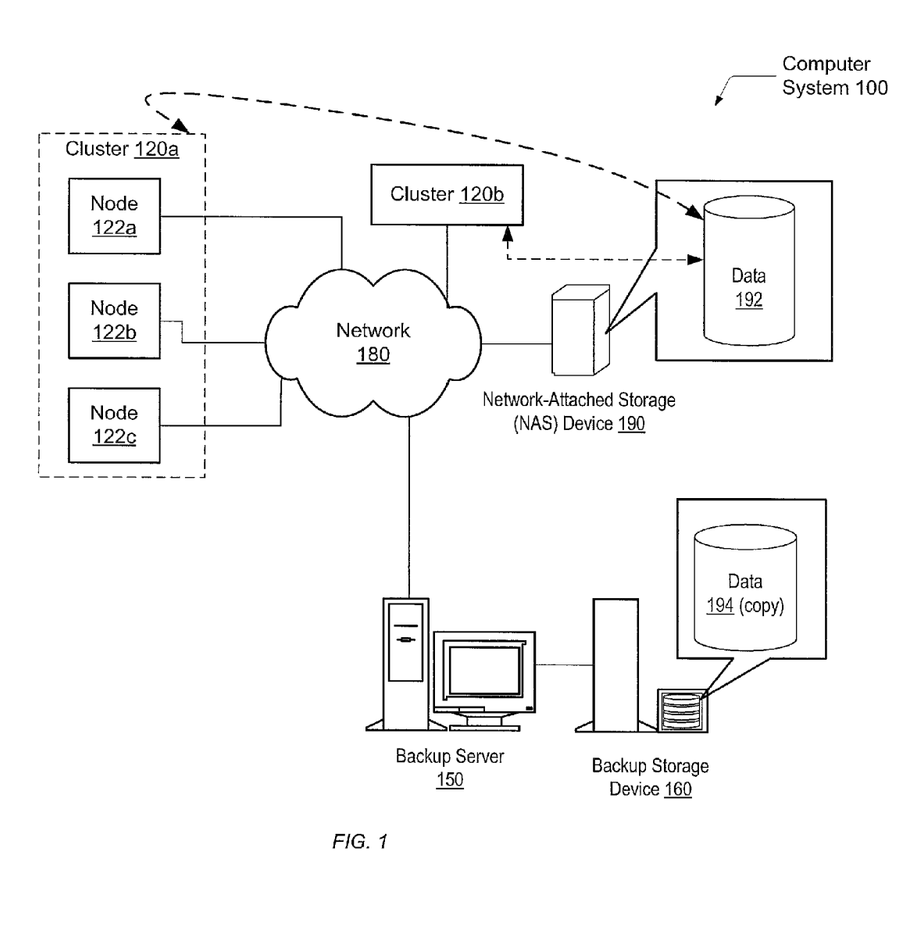
FIG. 1 is a generalized block diagram illustrating one embodiment of a computer system.

Referring to FIG. 1, a generalized block diagram of one embodiment of a computer system 100 is shown. As shown, system 100 includes clusters 120a and 120b interconnected through a network 180 to one another, to a Network-Attached Storage (NAS) device 170 and to a backup server 150. Disk storage 160 is coupled to backup server 150. Network 180 may include a variety of techniques including wireless connection, direct local area network (LAN) connections, wide area network (WAN) connections such as the Internet, a router, and others. Network 180 may comprise one or more LANs that may also be wireless. Network 180 may further include remote direct memory access (RDMA) hardware and/or software, transmission control protocol/internet protocol (TCP/IP) hardware and/or software, router, repeaters, switches, grids, and/or others.

In one embodiment of computing system 100, nodes 122a-122b are representative of any number of stationary or mobile computers such as servers, desktop PCs, workstations, laptops, handheld computers, blade servers, etc. The data that holds the information used and produced by applications executed on nodes 122a-122b and stored for later use may be referred to as a computer file, or file. Computer files may include photographic or other still images, documents, video streams, audio files, plain text files, or any other kind of data. In some embodiments the nodes 122a-122c may include an operating environment, e.g. an operating system. Alternatively, the nodes 122a-122c may comprise one or more virtual machines (VMs) operating with hypervisor technology. Symantec Corp., VMWare, Inc., Microsoft Corp., and others may provide virtualization platform software. Each virtual machine may maintain its own set of files, similarly as a physical computer would, such as operating system files, application program files, data files, etc. Whereas the files of a physical computer are typically stored on a hard disk, the files of each virtual machine may be stored in one or more virtual disk image files. A virtual disk image file may be formatted according to a particular specification. Virtual disk image file specifications in common use include at least the Virtual Hard Disk (VHD) format, the V2I format, and the Virtual Machine Disk Format (VMDK) format.

In addition to including software applications, each node may contain backup system agent software. The backup system agent may be software configured to assist a backup manager, which may be running on the backup server 150, to perform one or more backup functions. In some embodiments the backup system agent may also be configured to perform one or more backup functions independently of a backup manager. A backup copy 194 of the data 192 may be subsequently restored to the NAS device 190 (or to another computer system) in the event that it becomes necessary to do so. Recovery of the backup copy 194, such as a volume image backup file, may have a variety of uses. For example, it may be used during system deployment for the setup of many computers. Another use may include data recovery. The image-level backup file may allow rapid restoration of a system after data loss caused by an operating system crash, a virus attack, hardware failure, or otherwise.

Each VM may execute one or more applications. Whether or not nodes 122a-122c execute a VM, software applications being executed on nodes 122a-122c may simultaneously access a same file stored on NAS 190. Software including a distributed lock manager may be used to manage accesses to files on NAS 190 as further described later.

In various embodiments a Network-Attached Storage (NAS) device 190 may be any kind of device configured to store data. The NAS device 190 may be a computer specialized for providing file storage services to clusters 120a and 120b. The operating system and other software on the NAS device 190 provide the functionality of file systems, and access to files, and the management of these functionalities. A NAS device 190 is typically not designed to perform general-purpose computing tasks other than file storage. The NAS device 190 may not have a keyboard or display, and is instead controlled and configured over the network 180, sometimes by accessing their network address from a web browser.

Continuing with a description of the NAS device 190, a general-purpose operating system may not be used on the NAS device 190. Rather, a stripped-down operating system with minimal functionality may be used instead. The NAS device 190 may include one or more hard disks, often arranged into logical, redundant storage containers or RAID arrays (redundant arrays of inexpensive/independent disks). The data 192 may be stored on one or more of the hard disks of the NAS device 190.

The NAS device 190 may provide data storage at the file system level. The NAS device 190 may use file-based protocols such as Network Technology File System (NTFS), SMB/CIFS (Server Message Block/Common Internet File System) (used with MS Windows systems), or AFP (used with Apple Macintosh Computers). In the example of FIG. 1, files on the NAS device 190 may be accessed through a Network File System (NTFS) interface included in network 180. A file system operates as a special-purpose database for the storage, organization, manipulation, and retrieval of data.

In alternative embodiments, the number and type of clusters, servers, and storage devices is not limited to those shown in FIG. 1. Almost any number and combination of servers, desktop, nodes, and mobile clients may be interconnected in system 100 via various combinations of modem banks, direct LAN connections, wireless connections, WAN links, etc. Also, at various times one or more clusters and nodes may operate offline. In addition, during operation, individual client connection types may change as mobile users travel from place to place connecting, disconnecting, and reconnecting to system 100.

Figure 2:
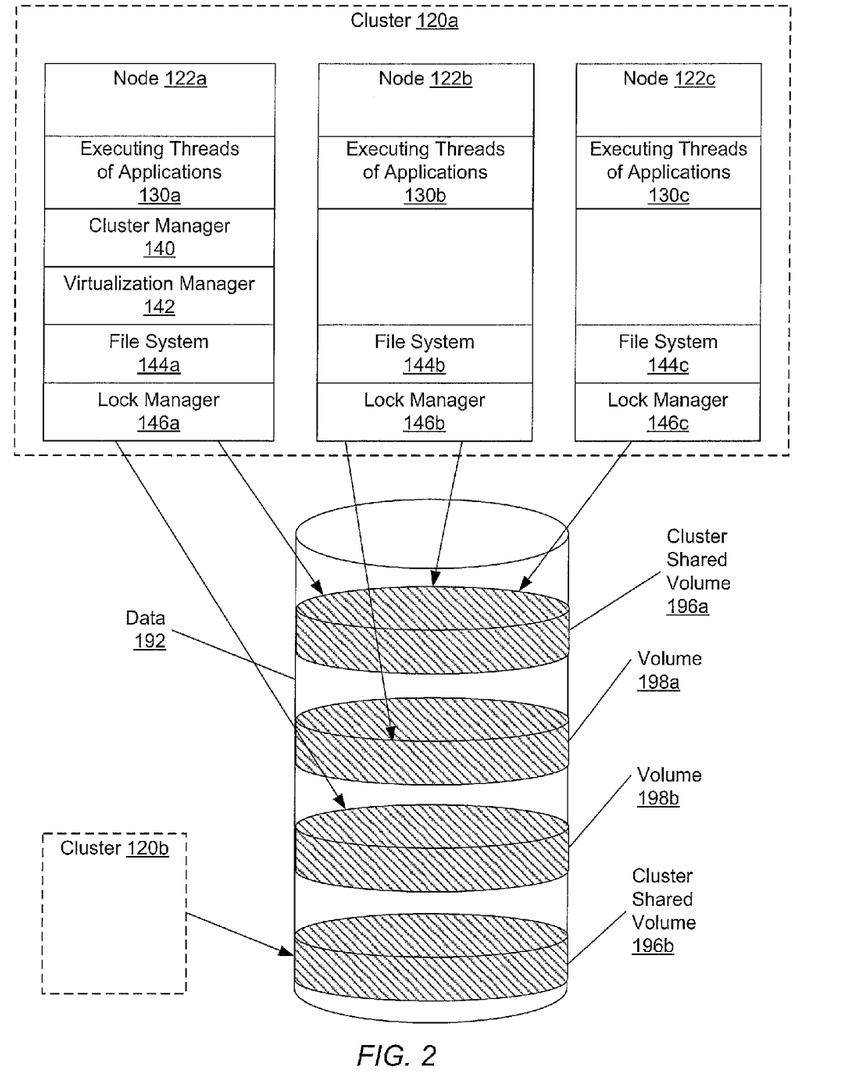
FIG. 2 is a generalized block diagram illustrating one embodiment of a cluster shared storage system.

Referring to FIG. 2, a generalized block diagram of one embodiment of a cluster shared storage system is shown. The same system components used in computer system 100 of FIG. 1 are numbered identically. Generally speaking, a cluster, such as cluster 120a and cluster 120b, is a group of linked nodes. The nodes, such as node 122a, node 122b, and node 122c, are typically connected to one another through fast local area networks (LANs), which are not shown to simplify the illustration. Each of clusters 120a and 120b may include any number of nodes. Node 122a, node 122b, and node 122c are shown for illustrative purposes, but cluster 120a is not limited to linking three nodes. Each node may be a single computer or a multi-processor system.

Each processor within a node in system 100 may host one or more virtual machines, wherein each virtual machine is configured to execute multiple software applications. As is well known to those skilled in the art, virtualization may be used in desktops and servers to fully or partially decouple software, such as an operating system (OS), from a system's hardware. Virtualization may provide an end-user with an illusion of multiple OSes running on a same machine each having its own resources.

As shown, node 122a may comprise executing threads 130, which are performing a workload directed by program instructions for software application files. These software application files may be stored on a memory and executable by one or more processors (not shown). Each of these processors, may include one or more cores, any of which may be single- or multi-threaded. Cluster manager software 140 manages inter-node messaging that travels over an interconnect, such as a LAN, to coordinate inter-node operations. In one embodiment, a cluster manager is a backend graphical user interface (GUI) or a command-line software application that executes on one or more of nodes 122a-122c. In another embodiment, a cluster manager executes on a server or a cluster outside of cluster 120a.

In one embodiment, cluster manager 140 is a cluster management agent that works with a cluster manager external to node 122a. Such an agent may run on each of nodes 122a-122c to manage and configure a set of services. The cluster manager 140 may be used to dispatch work for the cluster 120a to perform. In one embodiment, a subset of the cluster manager 140 is a remote desktop application that is used to send work and receive corresponding results from the cluster 120a.

A virtualization manager 142 may be used to configure and manage one or more virtual machines on node 122a. Each of the nodes 122b-122c may include a respective cluster manager and virtualization manager, but they are not shown for illustrative purposes. Later, a further description is provided of the handling of read and write operations of executing threads and the associated locking mechanisms. This description primarily focuses on the use of the three software layers including the executing threads 130a-130c of applications, the file systems 144a-144c and the lock managers 146a-146c. Each of the lock managers 146a-146c may comprise software code called a proxy that acts an intermediary, or an authorized agent, for memory access requests. The memory access requests may come from both the file system on the given node and from other nodes in the cluster seeking data resources from the given node. In one embodiment, a master (not shown) assigned for a given file may be included on one of the nodes 122a-122c. In one embodiment, the master exists on a node in addition to a lock manager proxy on the node. In another embodiment, the master exists within a lock manager along with the proxy. In one embodiment, the master may utilize communication through the network, such as network messages, rather than direct procedure calls. The file system 144a may provide access to data on a file server, such as NAS 190, by acting as a client for a network protocol. The file system 144a may be used as a shared disk file system wherein each one of nodes 122a-122c has access to a same external disk subsystem. Typically, in one embodiment, this same external disk subsystem, such as NAS 190, is a storage area network (SAN). The SAN has its own network of storage and does not provide file abstraction, but rather block-level operations. The file system 144a may provide the file abstraction.

A distributed lock manager may allow distributed software applications to synchronize accesses to shared resources. In addition, the distributed lock manager may allow distributed software applications to synchronize file I/O, such as read and write operations to the file. A distributed lock manager may provide file locking and coordination of shared disk accesses.

A distributed lock manager may also be referred to as a global lock manager (GLM). The global lock manager for cluster 120a comprises each of the lock managers 146a-146c master. A thread being executed on any one of nodes 122a-122c may issue read and write operations to a respective one of the file systems 144a-144c. The respective one of the file systems 144a-144c determines a lock request type and issues this lock request to a respective one of the lock managers 146a-146c. Communication over a network with lock managers on other nodes may be performed before granting the lock request corresponding to the read and write operations. The network communication ensures the read and write operations are performed in both an atomic and an in-order manner. If the network communication occurs frequently and a high number of messages are sent over the network, then computing performance is reduced. A further description of one embodiment is provided further below.

Cluster 120a may share a storage resource, such as data 192 stored on a data storage medium. In one embodiment, the data 192 may be stored on one or more hard disks. In one embodiment, the one or more hard disks may be arranged into logical, redundant storage containers or RAID arrays (redundant arrays of inexpensive/independent disks). In one embodiment, each of the nodes 122a-122c may share the data within cluster shared volume 196a on data 192. In addition, each of the nodes 122a-122c may access data within data 192 that is not shared with other nodes. Similarly, each of the VMs within nodes 122a-122c may both share data within a cluster shared volume and access data that is not shared with other VMs. One VM on node 122a may share data within cluster shared volume 196a and access data within volume 198b. A second VM on node 122b may share data within cluster shared volume 196a and access data within volume 198a.

Regarding dependent cluster resources, in contrast to a typical dependence on a standard cluster disk, a cluster shared volume may be a New Technology File System (NTFS) volume on a standard cluster disk that is made accessible for read and write operations by all nodes 122a-122c within the cluster 120a. The cluster-shared volume may stay mounted and visible to all cluster nodes at all times. Similarly, a second cluster-shared volume may be accessible for read and write operations by all nodes within the cluster 120b.

A cluster, such as cluster 120a, may be deployed to improve performance and/or availability over that of a single computer or a single node. A cluster takes advantage of the parallel processing power of the included nodes to provide high performance and/or high availability. The system's hardware within each of the nodes 122a-122c may include typical computer hardware such as one or more processors, each with one or more processing cores, a memory hierarchy with different levels of caches, logic for system bus management or packet processing, interfaces for peripherals, and so forth.

As described above, the clusters 120a and 120b may include a respective Global Lock Manager (GLM) that supports different lock modes. In one embodiment, a Global Lock Manager (GLM) manages coordination of simultaneous access of a same, shared resource. In one embodiment, each shared resource, such as a file or a directory block of files, on a cluster shared volume or a shared file system has a corresponding master. In one embodiment, a master for a given file may be provided on any one of the nodes 122a-122c. A master and a proxy within a lock manager on a given node may offer two types of locks, such as a regular lock and a range lock. The regular lock may also be referred to as a size lock. The range lock may also be referred to as a data lock. The size lock is used to protect the file size. The data lock is used to protect the data of the given file. In one embodiment, the file system uses one regular lock and one range lock to synchronize reads and writes to a shared file. This regular lock, which is also called the size lock, is used to synchronize access to the file size. The range lock, which is also called the data lock, is used to synchronize the reads and writes.

In response to a read or a write operation of an executing thread 130a on node 122a, the file system 144a may send a size lock request and a data lock request corresponding to both the operation and the identified given file. In addition, in the case of adding a new file to a directory or appending the given file, a requested range may include unallocated storage units intended to be part of the new file or the given file. The data lock request may specify a range, which identifies a portion of the given file for access. For example, the range may identify a particular number of bytes, words, blocks, pages or other unit of storage within the memory storage to be locked. An example and a method explaining how a lock is granted is provided further below.

In addition, a GLM for each of the clusters 120a-120b may support a lockahead mechanism. Generally speaking, a lockahead mechanism creates a lock request with a range larger than a range specified by a corresponding read or write operation. A prediction may be performed that a portion of the given file will be requested by a read or a write operation based upon determining sequential access is occurring and may continue. For example, a respective thread may be executing a loop. The lockahead mechanism attempts to lock this portion of the given file ahead of time before a read or a write operation requests this portion of the given file. For example, a read or a write operation may request to have access to read, modify, append or delete the specified one page of information in the given file. Typically, a lock request corresponding to the read or write operation is created by a respective one of the file systems 144a-144c with a range of one page located at an address or located by an identifier specified by the operation. If a specific address is not used, then alternatively, one or more identifiers including a file size, an offset into the file from a beginning of the file, and a requested size of a respective data portion may be used. Although a single lock request is described here, in another embodiment, a size lock request and a separate data lock request may be used. A lockahead mechanism within the respective one of the file systems 144a-144c may create a lock request corresponding to the read or write operation with a range of ten pages instead of one page. This expanded range may include the page specified by the read or write operation and nine contiguous pages following the specified page. Alternatively, the nine contiguous pages may be contiguously in front of the specified page. In yet another example, the nine pages may not be contiguous, but these pages may have an offset or a stride that is used to predictably identify them.

Figure 3:
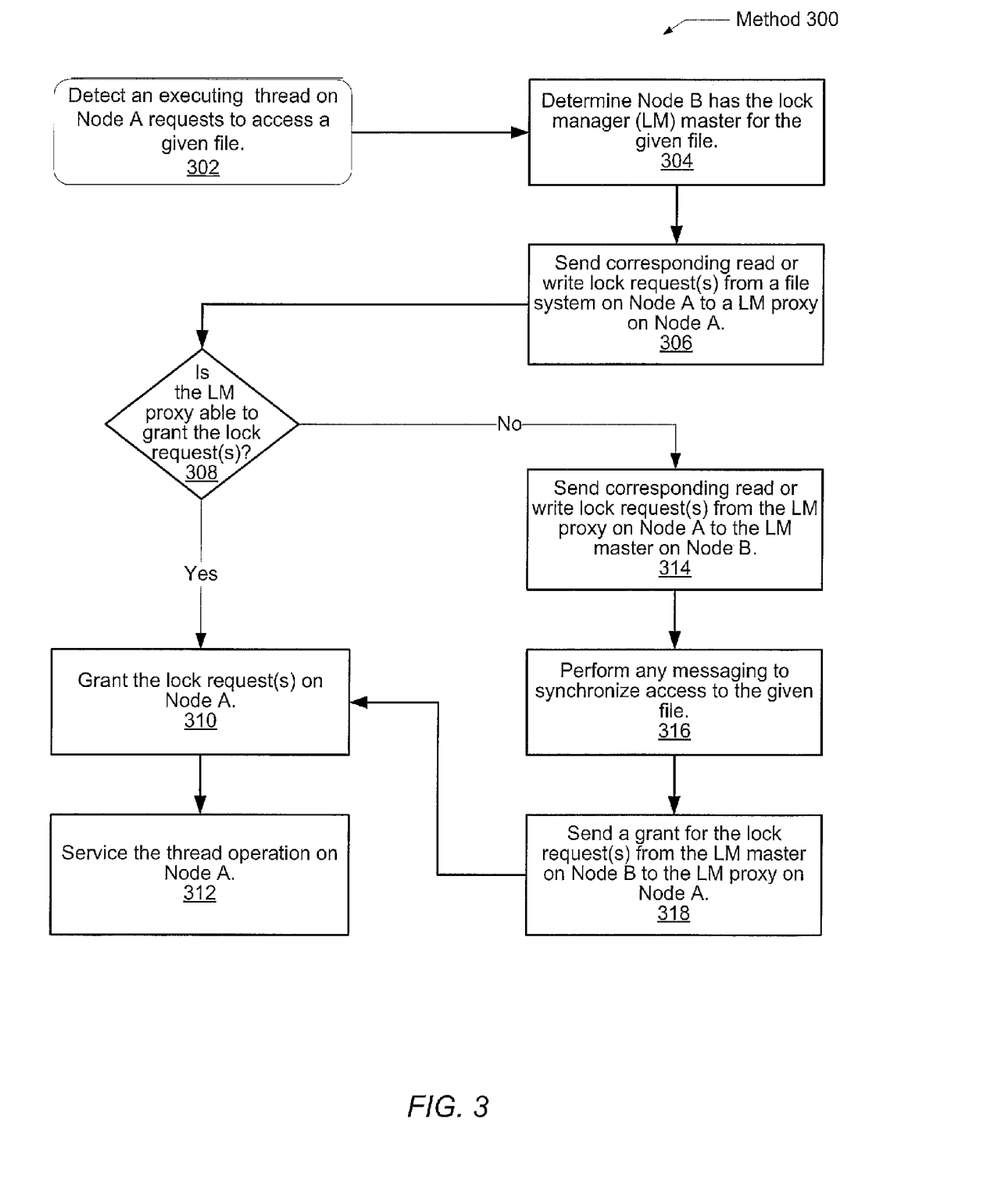
FIG. 3 is a flow diagram illustrating one embodiment of a method for obtaining a lock in a cluster file system.

Referring now to FIG. 3, one embodiment of a method 300 for servicing read and write operations for an executing thread in a cluster is shown. The components embodied in the computer system 100 and the cluster shared storage system of FIG. 2 described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

In block 302, a thread executing on node 122a, which may be referred to here as Node A, may have read or write operations for a given file. The read or write operations may be sent to the file system code on Node A. In order to maintain coherency and synchronized access of the given file with other executing threads in the cluster, a locking scheme may be used. In one embodiment, a two-level locking scheme is used. The two levels include a lock manager proxy and a master. As described earlier, the lock manager may be a third-level software layer. The third-level software layer may be below the first layer, which includes the software applications and the executing threads. Additionally, the third layer is below the second layer, which includes the file system on the node. The lock manager proxy may be referred to simply as proxy and the master may be referred to as master. The lock types and policies are further described shortly below. A proxy may be on the same node as the executing threads. However, the master may be located on a different node. In one embodiment, each file has a corresponding master. The master manages any outstanding locks on a corresponding given file and handles lock requests associated with the given file. In the given example, a corresponding lock manager (LM) master for the given file may be on node 122b, which may be referred to here as Node B.

In block 304, Node A determines Node B has the master for the given file. Using information within the read or write operation, the Node A may generate a hash value, which may be used as a global identifier. This global identifier may be referred to as a lockname. This generated value may include a volume identifier, an inode number, a file number, a portion or all of a directory path and a filename, and so forth. The Node A may index a small table with the generated lockname to determine a location of a master corresponding to the given file being accessed. The indexed table may indicate that Node B has the corresponding master. In one embodiment, the file system code on Node A performs this identification of the lock manager (LM) master for the two-level locking scheme. In another embodiment, the LM proxy on Node A determines this identification. Additionally, the proxy may perform this determination after the file system has sent a lock request in response to a read or a write operation. In such a case block 304 follows block 306 in method 300.

In block 306, the file system code on Node A sends a corresponding read or write size lock request to the LM proxy on Node A. Again, in one embodiment, the GLM for the cluster may support two types of locks, such as a size lock and a data lock. The size lock is used to protect the file size. The data lock is used to protect the data pages of the file. Instead of pages, the unit of storage for lock protection may be bytes, words, blocks or other. After receiving the read or write operations from the executing threads, the file system code may issue corresponding size lock requests with specified levels to the LM proxy. In one embodiment, values for a level of a size lock may include shared (SH), update (UP), and exclusive (EX). A SH size lock request may be used for read operations being performed on a given file by an executing thread. Multiple SH size lock requests for the given file may be granted at a same time. An EX size lock request for the given file may be granted when there are no other granted size lock requests for the given file. An UP size lock request may be used to retrieve up-to-date metadata corresponding to a given file, such as a file size. An UP size lock request for the given file may be granted while there are one or more SH size locks on the given file for other threads. In addition, there may be only one EX or one UP size lock granted at any one time within the cluster. The UP size lock may coexist with one or more SH locks. However, an EX size lock may not coexist with any other locks. The UP size lock may be used to transition a node from a SH size lock to an EX size lock. For example, multiple executing threads on one or more nodes may have a SH size lock on a given file. If two or more of the threads request to transition to an EX size lock, a deadlock situation may occur. A first thread may refuse to give up its SH size lock to allow a second thread to obtain an EX size lock, because the first thread also is requesting an EX size lock. Therefore, the UP size lock request may be used to avoid a deadlock or delay in granting a size lock request for either of the first or the second thread.

The second type of lock, which is the data lock, has two levels. These two levels are shared (SH) and exclusive (EX). In addition, a data lock request specifies a range, or a particular number of bytes, words, blocks, pages or other within the memory storage to be locked according to a specified level. When an executing thread on Node A performs read operations on a given file, the file system code on Node A may send a SH size lock request for the given file to the LM proxy on Node A. Additionally, the file system may send a SH data lock request for a range indicated by the read operation. In one embodiment, a data lock request for a read or a write operation is sent after the size lock request is granted. In another embodiment, a data lock request is sent with the size lock request. In yet another embodiment, a single lock request is sent, wherein the single lock request is used to protect both the file size and the pages of data within the given file.

In another example, an executing thread on Node A performs write operations on a given file, wherein the write operations increase the size of the file or append the given file. In response, the file system code on Node A may send an UP size lock request for the given file to the LM proxy on Node A. Additionally, the file system may send an EX data lock request for a range indicated by the write operation. In yet another example, an executing thread on Node A performs write operations on a given file, wherein the write operations either decrease the size of the file or modifies the given file without changing the file size. In response, the file system code on Node A may send an EX size lock request for the given file to the LM proxy on Node A. Additionally, the file system may send an EX data lock request for a range indicated by the write operation.

If the LM proxy on Node A is able to grant the received read or write size lock request (conditional block 308), then in block 310, the size lock request is granted. In one embodiment, each LM proxy may be configured to cache a level and a series of ranges dependent on a type of lock. This cache may be referred to as a node grant. A proxy may be responsible for managing the lock requests received from the file system code that may be satisfied by a corresponding node grant. For example, for a read operation executed by a thread on the node, the file system code may send a SH type size lock request to the LM proxy. For the given file, a range of the given file may already be cached in the node grant. If the level of the node grant is also SH, then the proxy is able to grant the size lock request for the given file. The LM proxy notifies the file system code that the size lock request is granted. In one embodiment, a subsequent data lock request is sent from the file system code on Node A to the LM proxy on Node A. If the range specified by the SH data lock request is found in the node grant, then the proxy is able to grant the data lock request. The data lock request may be gated by a granted size lock request. In another embodiment, the data lock request is sent at a same time as the size lock request is sent. When both lock requests are granted, the executing thread may proceed with the read or write operation. In yet another embodiment, a single lock request may be sent that is used to protect both the file size and the data pages of the file. In block 312, the executing thread is permitted to perform the read or write operation on the given file.

If the LM proxy on Node A is unable to grant the received read or write size lock request (conditional block 308), then in block 314, the proxy on Node A sends a corresponding read or write lock request(s) to the master on Node B. Node B was previously identified to be holding the master in block 304. In block 316, the master on Node B performs messaging in order to synchronize access to the given file. For example, in one case, no other thread on Node A or any other Node is accessing the requested given file. Only the original executing thread on Node A is accessing the given file. Therefore, the master on Node B does not send any revoke messages. In block 318, the master is able to grant the lock requests for the LM proxy on Node A. In another example, another thread may already have granted SH locks on the given file. This other thread may be on Node A or any other Node within the cluster. For this example, this other thread is executing on node 122c, which may also be referred to as Node C. In one embodiment, the master on Node B checks its node grant on Node B and identifies that Node C has SH locks on the given file. In another embodiment, the master on Node B indexes a table to determine Node C has at least one SH lock on the given file. However, multiple SH size locks on the given file is permitted. Therefore, in block 318, the master on Node B grants the SH lock requests to the proxy on Node A.

In yet another example, another thread may already have a granted EX lock on the given file. Again, this other thread may be on Node A or any other Node within the cluster. For this example, this other thread is executing on Node C. The master on Node B determines there is an executing thread on Node C with an EX size lock on the given file. In such a case, the master on Node B sends a revoke message to a LM proxy on the Node C. The revoke message directs the LM proxy on Node C to change its grant for the given file from EX to a Null Lock (NL). In one embodiment, the master may send a revoke message to Node C based on the level of the lock request from the proxy on Node A. For example, a SH lock request from the proxy on Node A may not qualify for a revoke message to be sent from the master on Node B to the proxy on Node C. However, an EX lock request from the proxy on Node A may qualify for a revoke message to be sent from the master on Node B to the proxy on Node C. The proxy on the Node C waits for each executing thread accessing the node grant on Node C corresponding to the given file to unlock. Afterward, the proxy on Node C sends a release message to the master on Node B. The release message indicates Node C has released its node grant for the given file. In block 318, the master on Node B sends a grant message to the proxy on Node A. The sent grant message provides the proxy on Node A at least the size lock. A data lock request may be granted at a later time, in one embodiment. In another embodiment, the data lock request may be granted at the same time as the size lock request is granted. Control flow of method 300 then moves to block 312.

When the file system code on Node A receives the grants for the size lock request and the data lock request, Node A may obtain the corresponding data of the given file from at least two sources. In one case, another node has a cached copy of at least the requested range of the given file. The cached copy may be retrieved from the other node. In the case of an EX lock on the given file due to the executing thread on Node C accessing the given file, the master on Node B may send a revoke message to the proxy on Node C to demote its lock from EX to NL. The revoke message directs the LM proxy on Node C to change its grant for the given file from EX to a Null Lock (NL). The proxy on the Node C waits for the executing thread accessing the node grant on Node C to unlock. In one embodiment, the file system on Node C may notify the proxy on Node C when the unlocking occurs. Afterward, the proxy on Node C sends a release message to the master on Node B.

Additionally, the proxy on Node C may send its copy of the metadata and data stored in its node grant to the master on Node B. Subsequently, the master on Node B passes this information to the proxy on Node A. The proxy on Node A may store this information in the corresponding node grant on Node A for use by executing threads on Node A. Alternatively, the master on Node B may direct the proxy on Node C to send its cached copy directly to the proxy on Node A. Accordingly, no access of a shared storage may be performed.

The cached data being sent from the proxy on Node C to the proxy on Node A may be referred to as piggyback data. This piggyback data allows Node A to avoid reading the shared storage subsystem disk for a current copy of the data. Further, in the case of the proxy on Node C previously having an EX lock, the proxy on Node C performs a revoke callback into its file system code. This callback invalidates the cached copy of the metadata and data corresponding to the given file. In one embodiment, in the case Node C had a previous EX lock, the proxy on Node C sends its cached copy of the data to the shared storage subsystem. In another embodiment, the proxy on Node C sends only modified data within the cached copy of the data to the shared storage subsystem.

If another node does not have a cached copy of at least the requested range of the given file then the file system or the proxy on Node A retrieves a copy of a specified range of the given file from the shared storage subsystem. The file system on Node A may now process the corresponding read and write operations on the retrieved copy based on its level of the lock. At a later time, the file system on Node A may request to promote its level of the lock. For example, when the master on Node B grants a SH lock request from the proxy on Node A, for a given byte range, the proxy on Node A may grant SH lock requests from the file system on Node A, wherein the lock requests correspond to read operations of the executing thread(s). These grants by the proxy on Node A include no communication between the proxy on Node A and the master on Node B. With no such communication, network traffic is reduced. Later, a thread executing on Node A may issue a write operation to modify or decrease the file size. The file system on Node A may request an EX size lock. Following the steps in method 300, the proxy on Node A sends an EX size lock request to the master on Node B in order to raise the node grant on Node A from SH to EX. The steps for acquiring a lock as described above may then be followed. At a later time, if each executing thread on Node A accessing the node grant corresponding to the given file unlocks prior to another thread on another node requesting the node grant, then the file system on Node A may release its EX size lock, but the proxy on Node A maintains the EX node grant. In other words, Node A may keep the cached metadata and data corresponding to the given file. Later requests by threads executing on Node A may utilize the cached data, which reduces network traffic to at least the master on Node B and reduces accesses to a lower shared storage subsystem.

Figure 4:
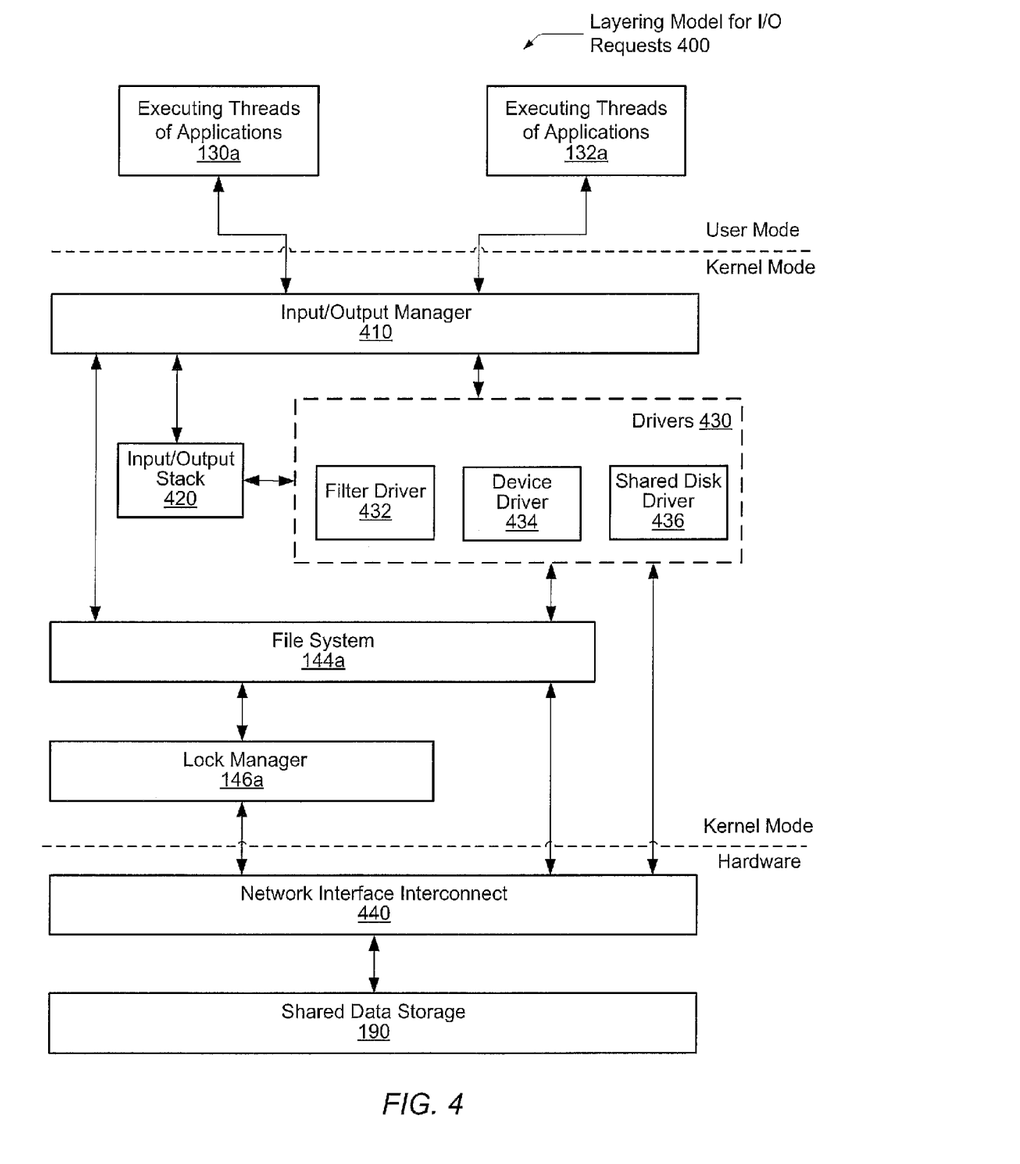
FIG. 4 is a generalized block diagram illustrating one embodiment of an input/output layering model.

Turning now to FIG. 4, a generalized block diagram illustrating one embodiment of an input/output layering model 400 on a node is shown. The same system components used in computer system 100 of FIG. 1 and the cluster shared storage system of FIG. 2 are numbered identically. For purposes of discussion, the components in this embodiment are shown in a certain logical layout and with certain coupling connections. However, some components may be absent, some components may have particular functionality in another component, and some components may be coupled differently in another embodiment. As shown, model 400 includes user mode components and kernel mode components. Executing threads 130a and 132a generated from software applications stored on a node, such as node 122a, may send read and write, or input/output (I/O), memory requests to an I/O manager 410 on a computer within the node 122a. The I/O manager 410 may receive the requests, create one or more corresponding packets, and route these packets to respective drivers and other code.

Multiple software layers may be located below the I/O manager 410. These software layers may include drivers and other code. These driver layers or drivers 430, including filter driver 432, device driver 434 and shared disk driver 436 may exist between an application and a piece of hardware. Although only a single driver is shown for each type of driver within drivers 430, several drivers of each category may exist. These drivers may be grouped together in stacks, or in multiple stacks within drivers 430. These drivers may work together to completely process a request targeted at a particular device. The I/O stack 420 may be used to direct requests to a driver within drivers 430 or other code regardless of its actual location. A layered driver model is one manner to process I/O requests. In this model, each driver in drivers 430 may be responsible for processing a part of a request. If the request cannot be completed, information for the lower driver in the stack may be set up and the request is passed along to that driver. Such a layered driver model may allow functionality to be dynamically added to a driver stack 420. It also allows each driver to specialize in a particular type of function and decouples it from having to know about other drivers.

In the embodiment illustrated in FIG. 4, the file system 144a is shown outside of drivers 430 to better associate it with the targeted shared data storage 190. A filter driver that receives a redirected I/O request to file system 144a may then examine, modify, complete, or pass along the requests it receives. For example, filter driver 432 may intercept I/O requests to the file system 144a. The filter driver 432 may then inspect both the request and the index of files to determine how to handle the request.

The file system 144a may provide a means for users to store information and retrieve it from nonvolatile media such as disks or tapes used in shared storage device 190. The file system 144a may be an intended target to receive requests to open, create, read, write and close files on disks. These requests typically originate in a user process, such as a thread executing on the node corresponding to instructions of applications. These requests are dispatched to the file system 144a via the I/O manager 410.

The I/O manager 410 may follow a given protocol regarding received requests. Before forwarding the request, however, the I/O manager 410 may check I/O stack 420 to determine if any other driver is layered over the files system 144a. The file system 144a may not realize that some other filter driver is layered above it and may behave as if the I/O manager 410 has sent the I/O request directly to it.

The file system 144a communicates with the proxy within the lock manager 146a to process I/O requests. For example, requesting and granting lock requests occurs with the communication between the file system 144a and the proxy within the lock manager 146a as described above regarding the steps of method 300. Any communication to a master on another node may occur via the network interface interconnect 440 and the corresponding network 180 (not shown here). A disk or volume manager may be utilized before the network interface interconnect 440, which isn't shown here for ease of illustration. During access of a given file on a shared storage subsystem by two executing threads, if a locking mechanism is inefficient, both executing threads may have reduced performance while waiting for lock requests to be granted.

Figure 5:
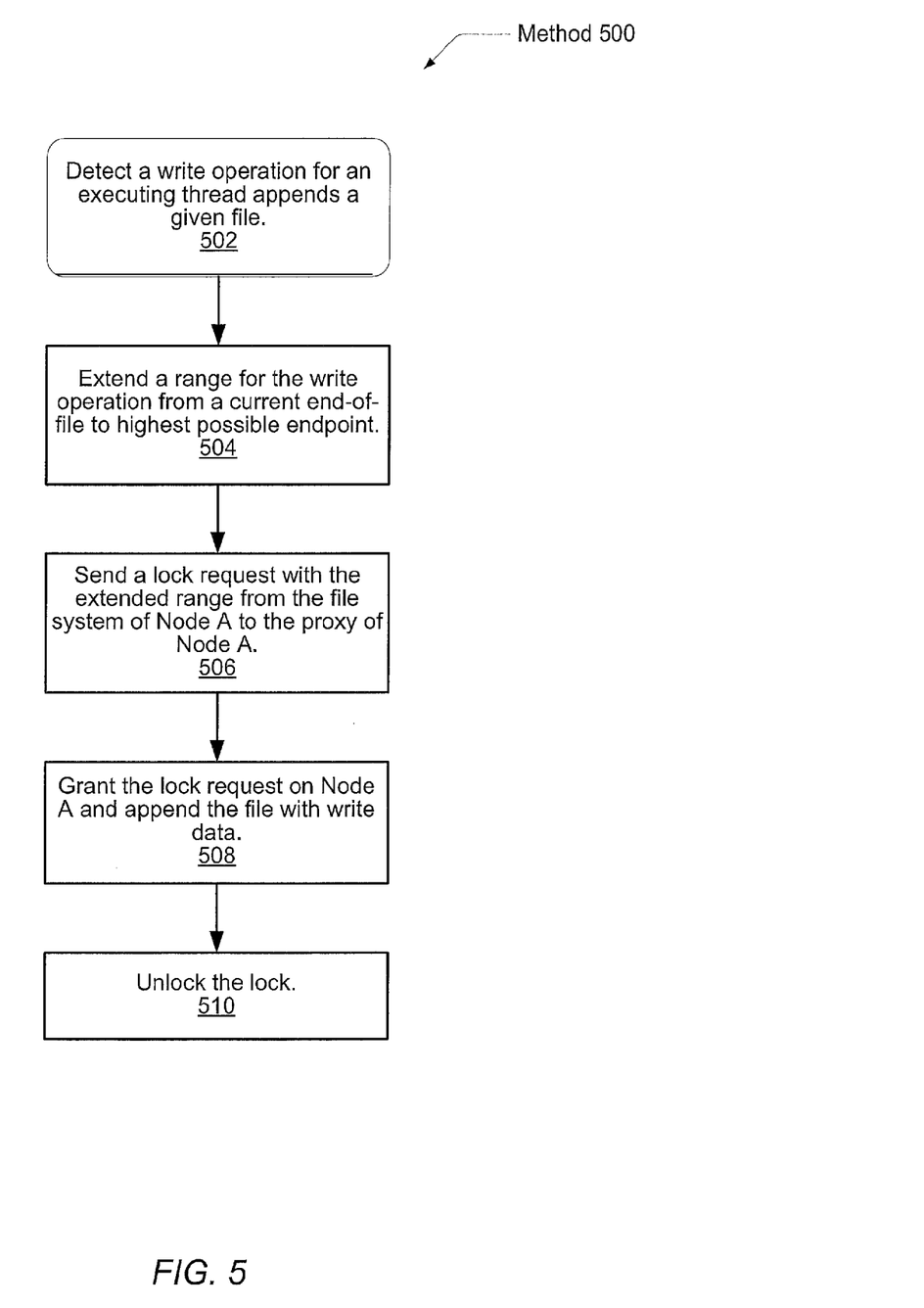
FIG. 5 is a flow diagram illustrating one embodiment of a method for an efficient write lock mechanism.

Referring now to FIG. 5, one embodiment of a method 500 for an efficient write lock mechanism during file appending is shown. The components embodied in the shared storage system 100 described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

In block 502, the file system on Node A detects a write operation for an executing thread on Node A, wherein the write operation appends a given file. The file system may compare an end-of-file value for the given file to a requested range of the write operation to determine an appending operation. Since the file system on Node A detects the given file is being appended by the executing thread, in block 504, the file system may expand a range specified by the write operation before including a requested range in a data lock request. For write operations that append the given file, the file system on Node A may determine no thread is reading or writing in a storage area for the given file past the end-of-file. For example, the write operation may indicate it is going to append a page of data to the given file. However, the file system on Node A may expand the requested range to two or more pages past the end-of-file, rather than one page past the end-of-file.

In one embodiment, an amount of storage area allocated for a write operation may have a minimal value, such as four pages, wherein each page may be 64 kilobytes (KB). A write operation may indicate three pages for appending data to the given file. Although the minimal threshold for storage allocation is greater than the range specified by the write operation, the file system may still expand the requested range beyond the minimal threshold that accommodates the write operation. This increase in the range may be in response to detecting the write operation is appending the given file. For example, the file system may send a data lock request with eight pages, sixteen pages, or another greater value as a requested range. In another embodiment, the file system determines a highest possible endpoint for the requested range and expands the request to that point. In block 506, the file system of Node A sends an UP size lock request to the proxy of Node A with the extended range. At the same time or a later time, the file system on Node A sends a data lock request with a range larger than a range indicated by the write operation.

For the first appending write operation, the node grant for the given file that is maintained by the proxy on Node A is not able to grant the range requested by a corresponding size lock or data lock request. This failed condition is shown in the conditional block 308 of method 300 and subsequent blocks 314-318. Therefore, the proxy on Node A sends the UP size lock request and the EX data lock request with the requested range to the master on Node B. Again, the master may be on any node in the cluster. Similar to the description for method 300, the Node B is chosen as hosting the master. As described earlier regarding block 304 of method 300, the proxy on Node A may compute a hash value corresponding to the write operation and index a table to determine Node B is the associated master. The master may perform any messaging to synchronize access to the given file. When the master is able to grant the request, it sends a grant for the lock request from Node B to the proxy on Node A. These steps may perform the same steps as described earlier for blocks 316 and 318 of method 300.

At a later time, the proxy on Node A receives a copy of the given file to cache in its node grant. As described above, this copy may have arrived from another node or from the shared storage subsystem. For a second and other appending write operations, the node grant for the given file that is maintained by the proxy on Node A is able to grant the extended range requested by the file system on Node A. This satisfied condition is shown in the conditional block 308 of method 300 and subsequent blocks 310-312. The steps described for blocks 308-312 may be performed and no network messages are sent to the master on Node B. In block 508, the executing thread on Node A appends the given file with the corresponding write operation. In block 510, the proxy on Node A may release the UP size lock and the EX data lock for the given file.

Figure 6:
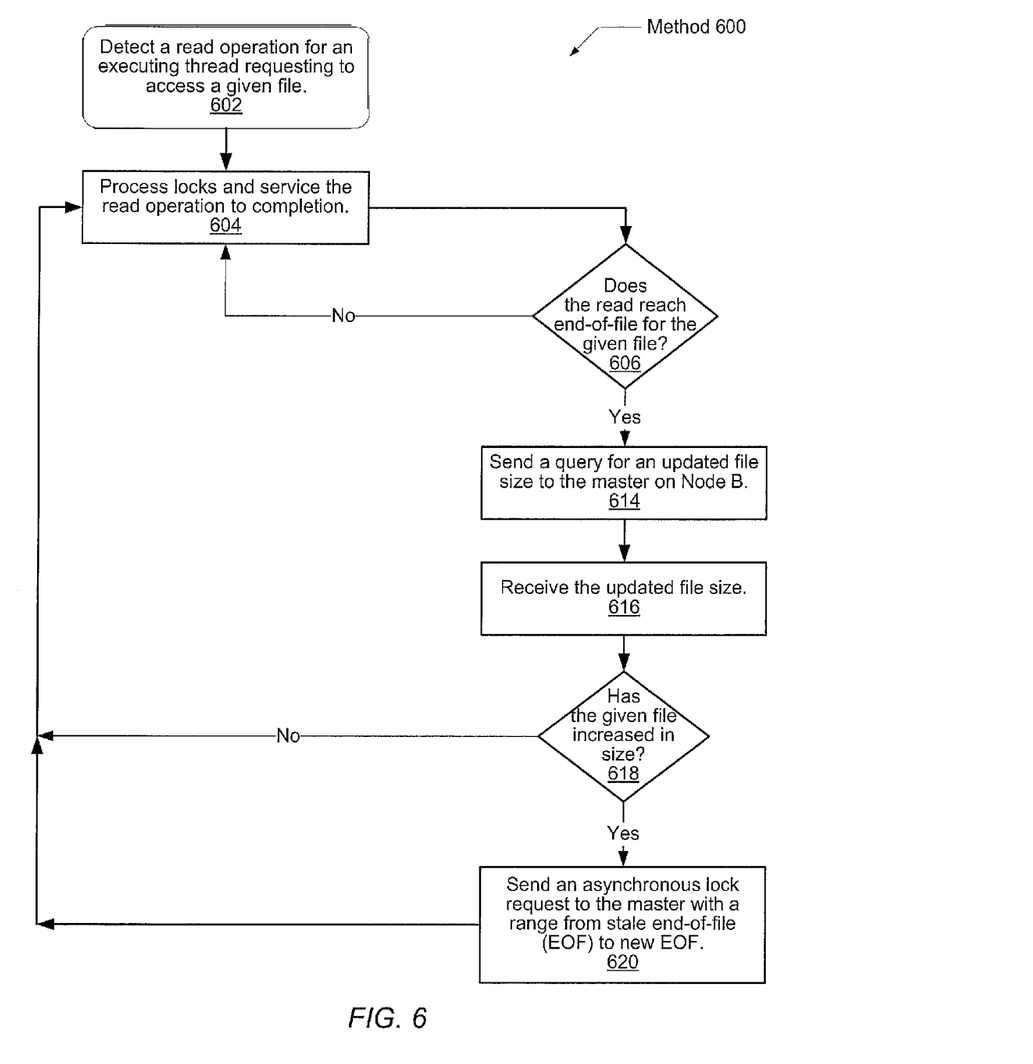
FIG. 6 is a flow diagram illustrating one embodiment of a method for an efficient read lock mechanism when a node is close to reaching an end of a file size.

Referring now to FIG. 6, one embodiment of a method 600 for an efficient read lock mechanism when a node is close to reaching an end-of-file is shown. The components embodied in the shared storage system 100, the cluster shared storage system in FIG. 2, and the software layer model 400 shown in FIG. 4 described above may generally operate in accordance with method 600. For purposes of discussion, the steps in this embodiment are shown in sequential order. However, some steps may occur in a different order than shown, some steps may be performed concurrently, some steps may be combined with other steps, and some steps may be absent in another embodiment.

In block 602, the file system on Node A detects a read operation for an executing thread on Node A. In block 604, the file system and the proxy on Node A begin processing the locks for the read operation and servicing the read operation. The steps described above for blocks 304-318 of method 300 and similarly for blocks 506-510 of method 500 may generally begin and be used in block 604. However, the appending and writing operations in method 500 are replaced with reading operations in the description of method 600. In one embodiment, both a SH size lock and a SH data lock may be requested. Once granted, the corresponding read operation may proceed. After the read operation is completed, any corresponding locks may be released, or unlocked. The steps described below for blocks 606-620 may occur concurrently with the processing of the locks and servicing the read operation in block 604.

Node A may receive a copy of a portion or the entire given file to cache in its node grant depending on the requested size specified by the read operation. As described above, this copy may have arrived from another node within the cluster or from the shared storage subsystem. Metadata may be included with the received data. This metadata may include a file size for the given file, an indication of a beginning of the file, and an indication of an end-of-file value. In addition, the read operation may provide an offset from the beginning of the given file where the read operation begins. Also, the read operation may provide the requested size to read. For example, the given file may have a file size of 10 kilobytes (KB). The read operation may indicate it is going to read the tenth kilobyte of the given file by providing an offset of nine kilobytes and a requested read size of one kilobyte. In this example, the read operation reaches the end-of-file for the given file. In another example, the read operation may indicate it is going to read the eighth kilobyte of the given file by providing an offset of seven kilobytes and a requested read size of one kilobyte. In addition, a given threshold distance may be set at two kilobytes. In this second example, the read operation reaches a point within the given file that is located within a given threshold distance from the end-of-file. However, regarding both examples, a second thread in another node, such as Node C, may be simultaneously appending the given file. In this case, the file system and the proxy in the first node, Node A, is using a stale value for the file size of the given file.

If the requested data for the read operation either does not reach the end-of-file for the given file or does not reach a point within the given file that is located within a given threshold distance from the end-of-file (conditional block 606), then the file system on Node A continues processing any locks and servicing the read operation to completion.

If the requested data for the read operation either reaches the end-of-file for the given file or reaches a point within the given file that is located within a given threshold distance from the end-of-file (conditional block 606), then in block 614, the file system on Node A sends a request to the proxy on Node A to determine an actual file size for the given file. As a result, as described above, the proxy on Node A may send an UP size lock request corresponding to the given file to the master on Node B. Since only one executing thread may have an UP size lock for a given file, if there is another executing thread accessing the given file, the master on Node B may send a revoke message to the proxy corresponding to that other executing thread. When any revoke messages are granted, the master on Node B may send a grant for the UP size lock including the updated file size to the proxy on Node A.

In block 616, the proxy on Node A may grant the UP size lock for the file system on Node A and additionally send the updated file size to the file system on Node A. The file system on Node A compares the received updated file size with its copy of the file size obtained with the read operation began. If the file system on Node A determines the given file increased in size (conditional block 618), then in block 620, the file system on Node A sends an asynchronous lock request with a range from a stale end-of-file value to a new end-of-file value. Another executing thread on another node may have been appending the given file while the executing thread on Node A was reading the given file. The resulting asynchronous size and/or data lock request may include a range comprising at least the bytes or pages from the stale end-of-file to a new end-of-file. The proxy on Node A may continue processing other memory access requests while the asynchronous lock request(s) are still being handled. When the asynchronous data lock request(s) are later granted by the master on Node B, a grant message may be sent to the proxy on Node A. The proxy on Node A may insert the granted range into its node grant. At a later time, subsequent read operations on Node A may request bytes within the granted range. Therefore, the proxy on Node A is able to grant lock requests for the file system on Node A for these subsequent read operations. Turning again to method 300, the steps described for blocks 308-312 may be performed and no network messages are sent to the master on Node B. Alternatively, the master on Node B may perform the determinations in the blocks 606 and 618. In addition, the master on Node B may send the request in block 620.

Figure 7:
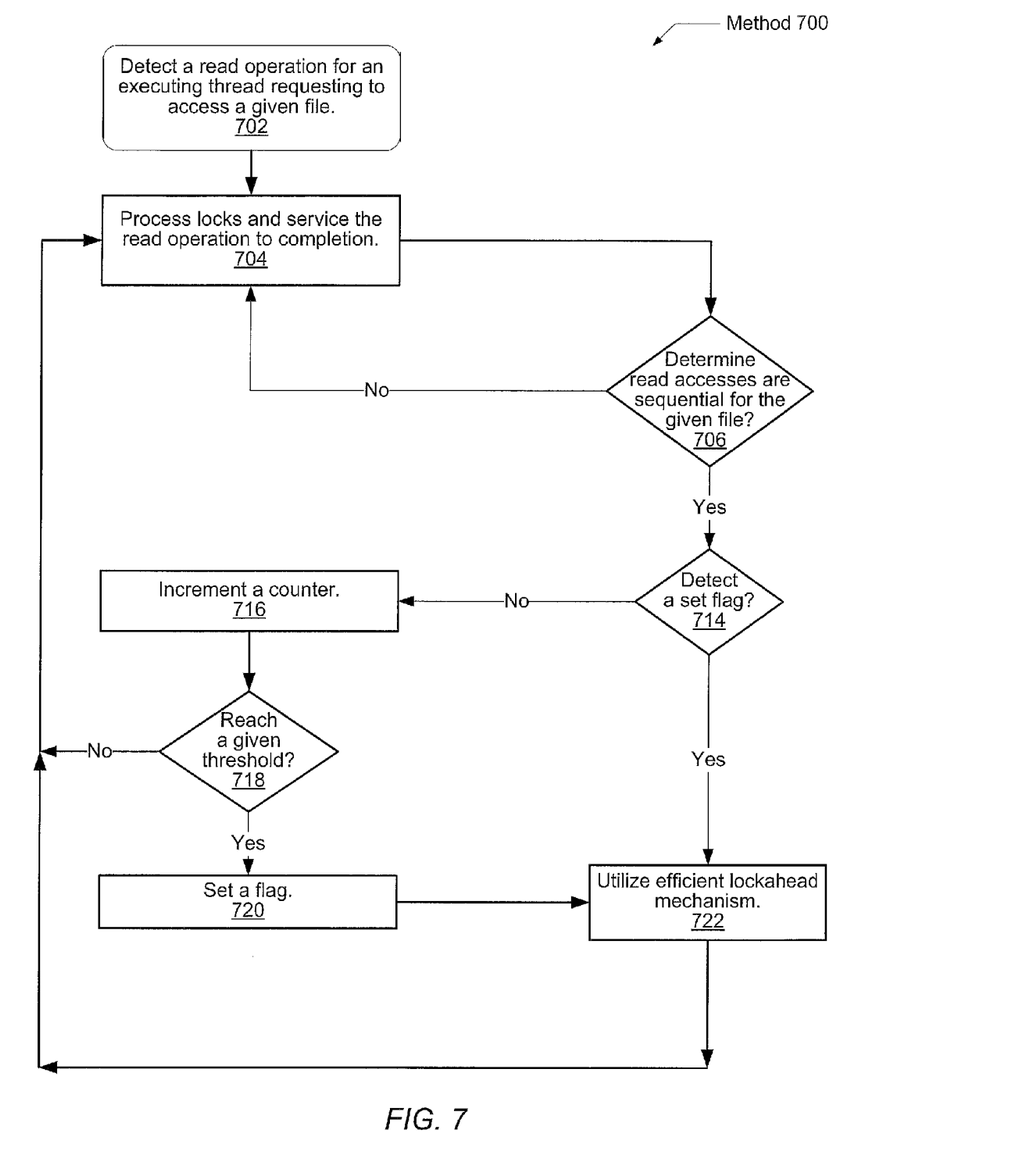
FIG. 7 is a flow diagram illustrating one embodiment of a method for an efficient read lock mechanism when sequential accesses are detected.

Referring now to FIG. 7, one embodiment of a method 700 for an efficient read lock mechanism when sequential accesses are detected is shown. The components embodied in the shared storage system 100, the cluster shared storage system in FIG. 2, and the software layer model 400 shown in FIG. 4 described above may generally operate in accordance with method 700. For purposes of discussion, the steps in this embodiment are shown in sequential order. However, some steps may occur in a different order than shown, some steps may be performed concurrently, some steps may be combined with other steps, and some steps may be absent in another embodiment.

The steps taken in blocks 702-704 are the same as the steps described above for steps 602-604 for method 600. Although the steps in method 700 are described for a read operation, the steps may also be used for a write operation. Therefore, method 700 may generally be used for a memory access operation. In one embodiment, when the lock manager (LM) master in Node B receives a SH size lock request and/or a SH data lock request, the master may check for a sequential read access of the given file. In another embodiment, the master may perform this check when it is ready to grant the SH size lock request and/or the SH data lock request and send the grant message to the proxy on Node A. In yet another embodiment, the master on Node B may check for a stride read access of the given file at either of these two times.

Figure 8:
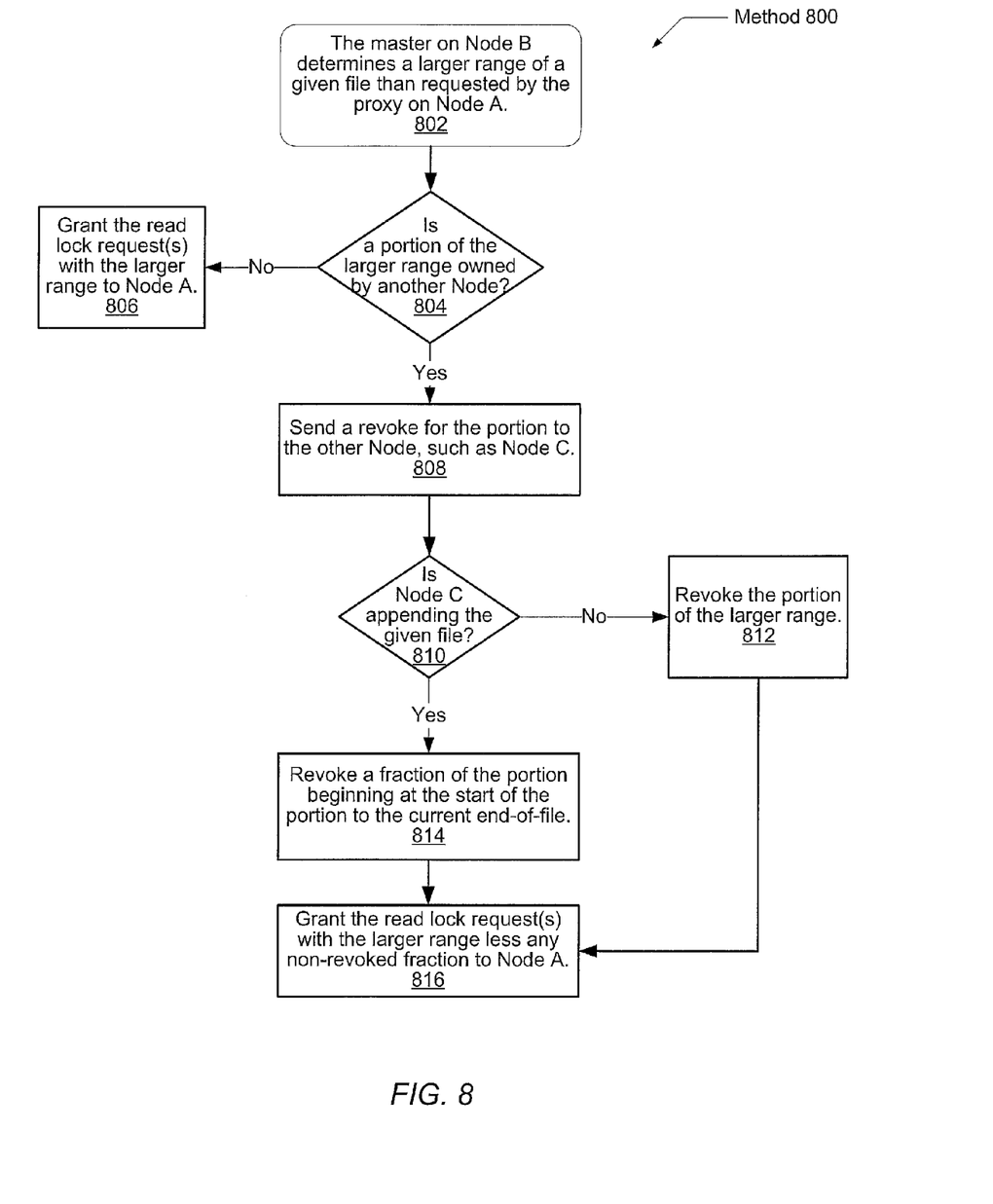
FIG. 8 is a flow diagram illustrating one embodiment of a method for an efficient lockahead mechanism when a node is detected to sequentially access a given file.

If the master on Node B does not determine a sequential access for the given file occurs (conditional block 706), then control flow of method 700 moves to block 704. If the master on Node B determines a sequential read access from Node A for the given file (conditional block 706) and a given flag is set (conditional block 714), then in block 722, an efficient lockahead mechanism may be utilized. This lockahead mechanism is further described shortly regarding method 800. If the given flag is not set (conditional block 714), then in block 716, a counter may be incremented in order to determine a count of sequential read accesses. If a given threshold is not reached (conditional block 718), then control flow of method 700 moves to block 708. Otherwise, control flow of method 700 moves to block 720, the flag is set and the control flow of method 700 moves to block 722.

Referring now to FIG. 8, one embodiment of a method 800 for an efficient lockahead mechanism when a node is detected to sequentially access a given file is shown. The components embodied in the shared storage system 100, the cluster shared storage system in FIG. 2, and the software layer model 400 shown in FIG. 4 described above may generally operate in accordance with method 800. For purposes of discussion, the steps in this embodiment are shown in sequential order. However, some steps may occur in a different order than shown, some steps may be performed concurrently, some steps may be combined with other steps, and some steps may be absent in another embodiment.

Referring again to method 700 in FIG. 7, block 722 had been reached and the master in Node B has detected sequential read accesses by an executing thread on Node A. Although the steps in method 800 are described for a read operation, the steps may also be used for a write operation. Therefore, method 800 may generally be used for a memory access operation. In block 802, the master on Node B determines a larger range to grant of the given file than requested by the read operation from Node A. The larger range may be double the requested size or some other larger percentage of the originally requested range. If the master on Node B determines a portion of the larger range is not locked by another executing thread on another node (conditional block 804), then in block 806, the master on Node B grants the read lock requests with the larger range for Node A. At a later time, Node A may receive a copy of the given file to cache in its node grant. As described above, this copy may have arrived from another node or from the shared storage subsystem.

If the master on Node B determines a portion of the larger range is owned by another node (conditional block 804), then in block 808, the master on Node B sends a revoke message regarding the portion of the larger range to the other Node, such as Node C. In one example, the portion may be all of the larger range. In another example, the portion is a fractional part of the larger range. In one embodiment, the master on Node B continues with a grant of the read lock requests with the original range while the master attempts to obtain a portion or all of the larger range. In another embodiment, the master on Node B waits to grant any read lock request until it is known what fraction of the larger range the master is able to grant. In one embodiment, the master on Node B may determine whether Node C is appending the given file. In another embodiment, the proxy on Node C notifies the master on Node B that an executing thread on Node C is appending the given file. If it is determined that Node C is not appending the given file (conditional block 810), then in block 812, the portion may be revoked from Node C using the steps described earlier. Then in block 816, the master on Node B grants the read lock request(s) for Node A with the larger range less any non-revoked fraction to Node A if there has been any non-revoked fraction. Turning again to method 300, for subsequent memory accesses targeting the granted larger range, the steps described for blocks 308-312 may be performed and no network messages are sent to the master on Node B.

If it is determined that Node C is appending the given file (conditional block 810), then in block 814, the proxy on Node C may allow a fraction of the portion of the larger range to be revoked, such as from a beginning of the portion to the current end-of-file value stored on Node C. This fraction may be revoked from Node C using the steps described earlier. Then control flow of method 800 moves to block 816.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for use in a computing system, the method comprising:
   storing on a first node of a plurality of nodes at least a first portion of a given file;
   detecting a write operation targeted to the given file;
   in response to determining the write operation is not configured to write beyond the end of the given file, requesting a first write lock on a first range of storage units configured to accommodate the write operation; and
   in response to determining the write operation is configured to write beyond the end of the given file, requesting a second write lock on a second range of storage units, wherein the second range is greater than the first range;
   in response to detecting a read targeted to a copy of the given file stored on a second node and determining a count of sequential read operations targeted to the given file on the second node reaches a threshold, requesting a read lock with a third range larger than a range configured to accommodate said read operation.

2. The method as recited in claim 1, wherein the second range is configured to accommodate a plurality of write operations.

3. The method as recited in claim 1, further comprising:
   in response to determining the read operation is configured to read data from the copy of the given file, requesting an up-to-date file size for the given file;
   in response to determining the up-to-date file size for the given file is greater than a file size of the copy of the given file when stored on the second node, requesting a read lock with a fourth range configured to accommodate read operations targeted to locations beyond the end of the copy of the given file.

4. The method as recited in claim 3, in response to determining the first node has stored data corresponding to the given file, the method further comprises receiving data located within the fourth range from the first node.

5. The method as recited in claim 1, wherein in response to determining at least a portion of the third range is locked by the first node, the method further comprises sending a request to revoke to the first node for the portion of the third range.

6. The method as recited in claim 5, further comprising granting the request to revoke a first subset of the portion of the third range, wherein the first subset is between a beginning of the portion of the third range and an up-to-date value of the end of the given file.

7. The method as recited in claim 5, further comprising rejecting the request to revoke a second subset of the portion of the third range, wherein the second subset is between the up-to-date value of the end of the given file and an end of the portion of the third range.

8. A computer system comprising:
   a data storage medium coupled to a plurality of nodes, wherein the data storage medium is configured to store data corresponding to the plurality of nodes;
   a first node of the plurality of nodes configured to:
      store at least a first portion of a given file;
      detect a write operation targeted to the given file;
      in response to determining the write operation is not configured to write beyond the end of the given file, request a first write lock on a first range of storage units configured to accommodate the write operation; and
      in response to determining the write operation is configured to write beyond the end of the given file, request a second write lock on a second range of storage units, wherein the second range is greater than the first range;
      in response to detecting a read targeted to a copy of the given file stored on a second node and determining a count of sequential read operations targeted to the given file on the second node reaches a threshold, request a read lock with a third range larger than a range configured to accommodate said read operation.

9. The computer system of claim 8, wherein the second range is configured to accommodate a plurality of write operations.

10. The computer system of claim 9, further comprising a second node of the plurality of nodes configured to:
   in response to determining the read operation is configured to read data from the copy of the given file, request an up-to-date file size for the given file;
   in response to determining the up-to-date file size for the given file is greater than a file size of the copy of the given file when stored on the second node, request a read lock with a fourth range configured to accommodate read operations targeted to locations beyond the end of the copy of the given file.

11. The computer system of claim 8, further comprising a third node of the plurality of nodes including a global lock manager corresponding to the given file, wherein the third node is configured to, in response to determining at least a portion of the fourth range is locked by the first node, send a revoke message to the first node for the portion of the fourth range.

12. The computer system of claim 11, wherein the first node is further configured to revoke a first subset of the portion of the fourth range, wherein the first subset is between a beginning of the portion of the fourth range and an up-to-date value of the end of the given file.

13. The computer system of claim 12, wherein the first node is further configured to reject to revoke a second subset of the portion of the fourth range, wherein the second subset is between the up-to-date value of the end of the given file and an end of the portion of the fourth range.

14. The computer system of claim 13, wherein the first writing node is further configured to:
   grant a first subset of the portion to be revoked, wherein the first subset is between a beginning of the portion and the up-to-date end of file (EOF); and
   reject a second subset of the portion to be revoked, wherein the second subset is between the up-to-date EOF and an end of the portion.

15. A computer-readable storage medium storing program instructions that are executable to:
   store on a first node of a plurality of nodes at least a first portion of a given file;
   detect a write operation targeted to the given file;
   in response to determining the write operation is not configured to write beyond the end of the given file, request a first write lock on a first range of storage units configured to accommodate the write operation; and
   in response to determining the write operation is configured to write beyond the end of the given file, request a second write lock on a second range of storage units, wherein the second range is greater than the first range;
   in response to detecting a read targeted to a copy of the given file stored on a second node and determining a count of sequential read operations targeted to the given file on the second node reaches a threshold, request a read lock with a third range larger than a range configured to accommodate said read operation.

16. The computer-readable storage medium of claim 15, wherein the program instructions are further executable to:
   in response to determining the read operation is configured to read data from the copy of the given file, requesting an up-to-date file size for the given file;
   in response to determining the up-to-date file size for the given file is greater than a file size of the copy of the given file when stored on the second node, requesting a read lock with a fourth range configured to accommodate read operations targeted to locations beyond the end of the copy of the given file.

17. The computer-readable storage medium of claim 15, wherein in response to determining at least a third portion of the fourth range is locked by the first node, the program instructions are further executable to send a revoke message to the first node for the third portion.

* * * * *